United States Patent [19]
McKenzie

[11] Patent Number: 5,941,228
[45] Date of Patent: Aug. 24, 1999

[54] RELEASE AND LOCK SYSTEM FOR THE FOLD DOWN BARBEQUE SHELVES

[75] Inventor: Stuart McKenzie, Ontario, Canada

[73] Assignee: Fiesta Barbeques Limited

[21] Appl. No.: 09/038,088

[22] Filed: Mar. 11, 1998

[51] Int. Cl.⁶ .................................................. F24B 3/00
[52] U.S. Cl. ..................... 126/25 R; 126/9 R; 126/41 R; 248/188; 248/240.4
[58] Field of Search ................................. 126/41 R, 25 R, 126/9 R, 277, 276, 39 B, 9 B; 248/188, 214, 129, 240.4, 294.1; 211/175; 99/449

[56] References Cited

U.S. PATENT DOCUMENTS

| 3,455,291 | 7/1969 | Glass . | |
|---|---|---|---|
| 3,567,065 | 3/1971 | Dinse . | |
| 4,649,599 | 3/1987 | Beller . | |
| 4,955,358 | 9/1990 | Harris et al. | 126/41 R |
| 5,076,256 | 12/1991 | Raymer et al. | 126/41 R |
| 5,090,398 | 2/1992 | Raymer et al. | 126/41 R |
| 5,277,106 | 1/1994 | Raymer et al. . | |
| 5,323,758 | 6/1994 | Minshall | 126/25 R |
| 5,471,916 | 12/1995 | Bird et al. . | |
| 5,623,866 | 4/1997 | Home . | |

FOREIGN PATENT DOCUMENTS 8800260  10/1988  Germany .

*Primary Examiner*—James C. Yeung

[57] ABSTRACT

A simple locking latch arrangement is disclosed which maintains barbecue side shelves in the horizontal orientation. The latch arrangement is freely pivotal on pin members of the shelf and prevent upward removal of the pins unless the latch is moved to the release position. The latch is designed to provide a gravity bias urging the latch to the locked position.

5 Claims, 5 Drawing Sheets

RELEASE AND LOCK SYSTEM FOR THE FOLD DOWN BARBEQUE SHELVES

FIELD OF THE INVENTION

The present invention relates to barbeque grills, and more particularly, relates to an arrangement for convenient locking of drop down side shelves of the barbeque.

BACKGROUND OF THE INVENTION

Well known outdoor barbeque grills typically comprise a frame portion of a plurality of vertical leg members, cooking vessels supported on the frame portion, hinged lid and one or more side and front shelves. It is well known to provide brackets for selective pivotal movement of the side and front shelves.

An example of such a barbeque is shown in our U.S. Pat. No. 5,323,758. The patent shows a multi-function bracket for securing of the legs to the cooking vessel and this bracket also serves to support the side shelves. The bracket has slots for receiving pin members of a shelf to attached to the barbeque and allow positioning of the shelf in the horizontal position or in a hanging vertical position. It also allows the shelf to be completely removed. The shelf in the horizontal position is maintained in the slots, however, an accidental upward and outward force could cause the shelf to change position.

The present invention provides a simple method for maintaining the functionality of the shelf and locking of the shelf in the horizontal position.

SUMMARY OF THE INVENTION

A barbeque grill according to the present invention comprises a plurality of vertical legs, a cooking vessel, a plurality of bracket arrangements where each bracket arrangements where each bracket arrangement secures one of the vertical legs to the cooking vessel. Each bracket arrangement includes a shelf support structure having a pair of horizontally and vertically offset slots. A barbeque shelf is supported either side of the shelf by one of the bracket arrangements. The barbeque shelf on each side includes a pair of horizontally and vertically offset pins adapted to slide within respect ones of said slots for selectively (i) locking the shelf in a horizontal position (ii) pivoting of the shelf downwardly from the horizontal position to a vertical position and (iii) removing of the shelf from the bracket arrangements. The shelf includes on each side thereof and associated with one of said pins, a gravity latch. The gravity latch includes a central bearing portion retained on and pivotable about the pin with a latch including a release arm and a catch arm. The catch arm includes a locking flange for preventing removal of the shelf when in the horizontal position. The release arm is accessible at the top of the shelf and allows movement of the latch between a locked position and a release position. The catch arm and the release arm cooperate to provide a gravity bias urging the latch to the locked position when the shelf is in the horizontal position. The release arm also allows movement of the latch against the gravity bias to the release position allowing the shelf to be removed and/or moved to the vertical position.

According to an aspect of the invention, the latch is positioned inwardly to the sides of the shelf in a recessed area of the shelf.

According to a further aspect of the invention, the release arm in the locked position of the latch is generally flush with the plane of the horizontal shelf.

According to a further aspect of the invention, the release arm and the latch arm are generally perpendicular and the bearing is located adjacent the intersection of the arm.

According to yet a further aspect of the invention, the locking flange forms an upwardly opening channel which engages an undercut region of the respective arm.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
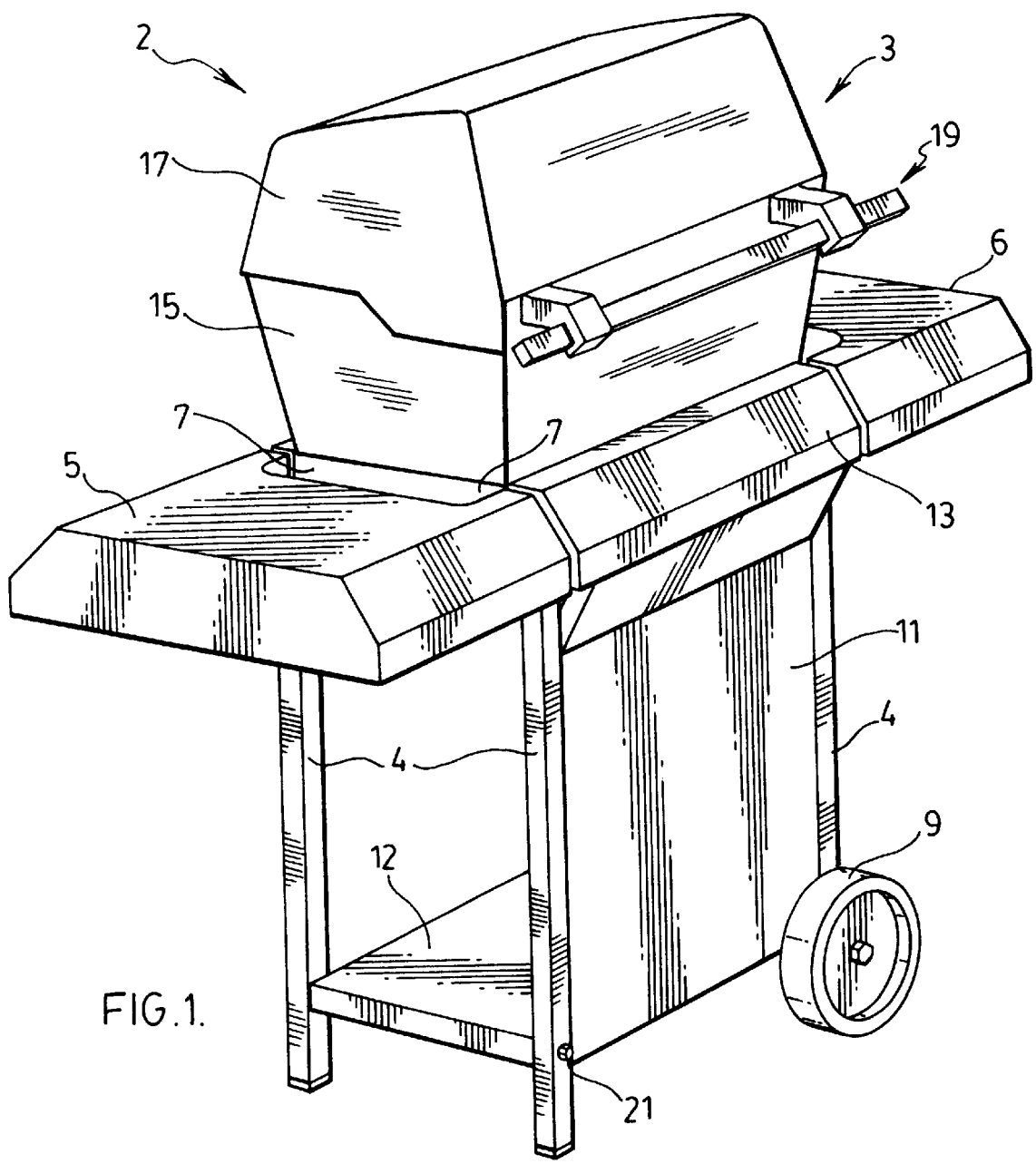
FIG. 1 is a perspective view of a barbeque grill.

The barbeque grill 2 shown in FIG. 1 includes the cooking vessel 3 supported by vertical legs 4 with side shelves 5 and 6 located either side of the cooking vessel. These side shelves are supported by side brackets 7 which will be more clearly described with respect to FIGS. 2 through 8. The barbeque grill basically has a cart like structure with wheels 9 at one end thereof as is well known in this field. The barbeque grill includes a front panel 11, a bottom shelf 12 and a control panel 13. The side brackets and the shelves can be suitably connected to the vertical legs, for example, by bolts such as bolt 21. Our prior U.S. Pat. No. 5,323,758 illustrates how fewer parts can be used in assembly of the barbeque.

The cooking vessel 3 is of a clam shell construction comprising a lower portion 15 for housing a gas or charcoal heating source and an upper lid 17 which is hinged to the lower portion 15 for pivotal movement in response to lifting of a lid by a handle 19.

Figure 2:
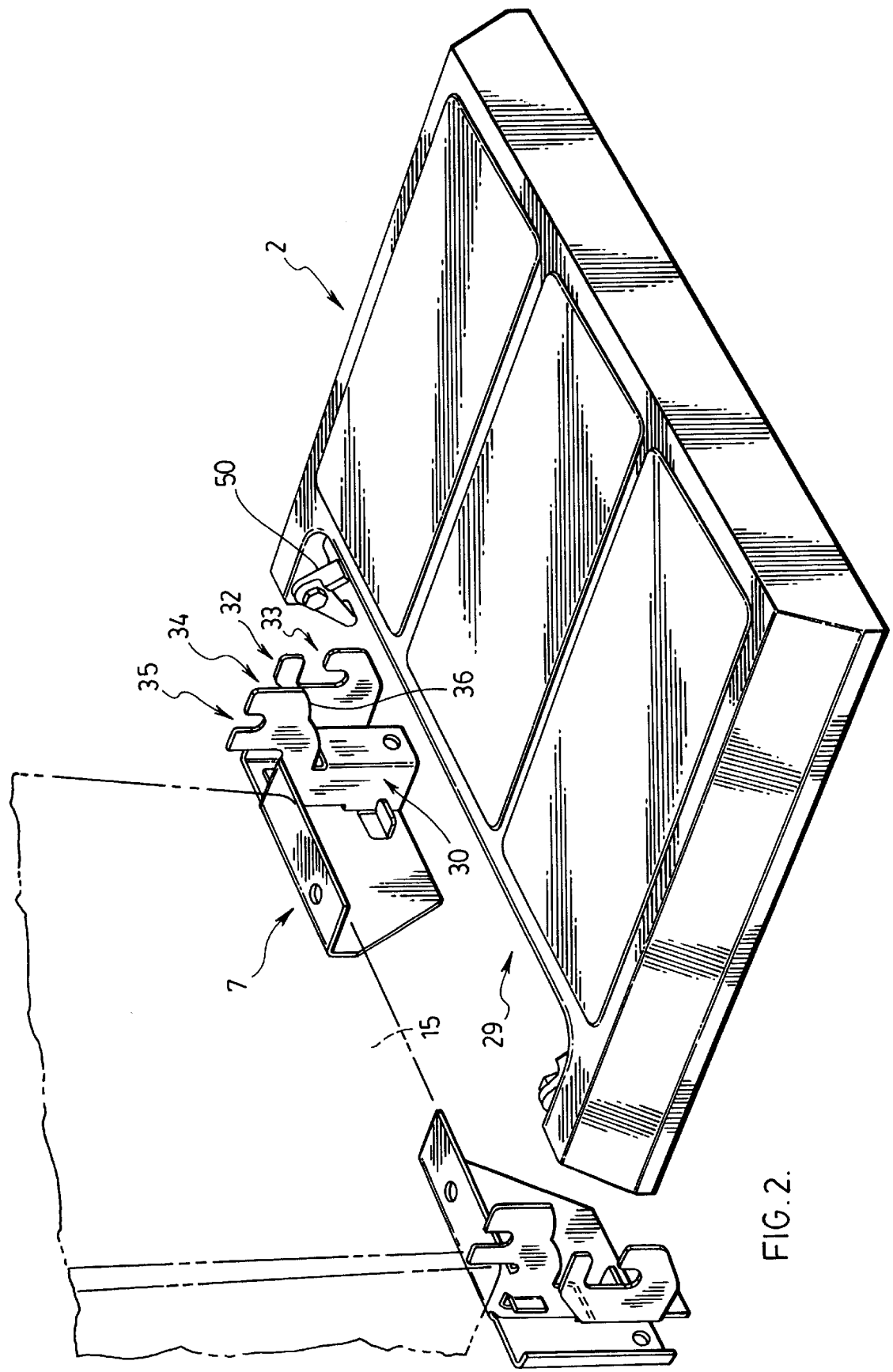
FIG. 2 is a partial perspective view showing details of the bracket arrangements and the cooperation with a side shelf.

As shown in FIG. 2, the bracket arrangements 7 are connected to the lower surface of the lower portion 15 of the cooking vessel 3. The bracket arrangement 7 served to secure the vertical legs 4 to the cooking vessel 3 and the bottom shelf 12 provides appropriate reinforcement for the vertical legs.

Each of the bracket arrangements 7 include a lower arm 32 having a slot 33 and an upper arm 34 having a slot 35 for cooperating and supporting pins 40 and 42 of the barbeque shelf 2. Arm 34 includes a curved lower edge 36 which cooperates with the gravity latch 50 for locking of the shelf in a horizontal position. The barbeque shelves 2 each have inwardly directed pins 40 and 42 for being received in the slots of arm 32 and 34. The slots 33 and 35 open in different directions, i.e., slot 35 opens upwardly and slot 33 opens horizontally. With this arrangement, the pins 40 and 42 are inserted into the slots as illustrated in FIGS. 3, 4, 5 and 6. Pin 40 is aligned with the opening of slot 33 and is moved into the slot and then is allowed to move downwardly into the slot causing pin 42 to be received in slot 35.

Figure 3:
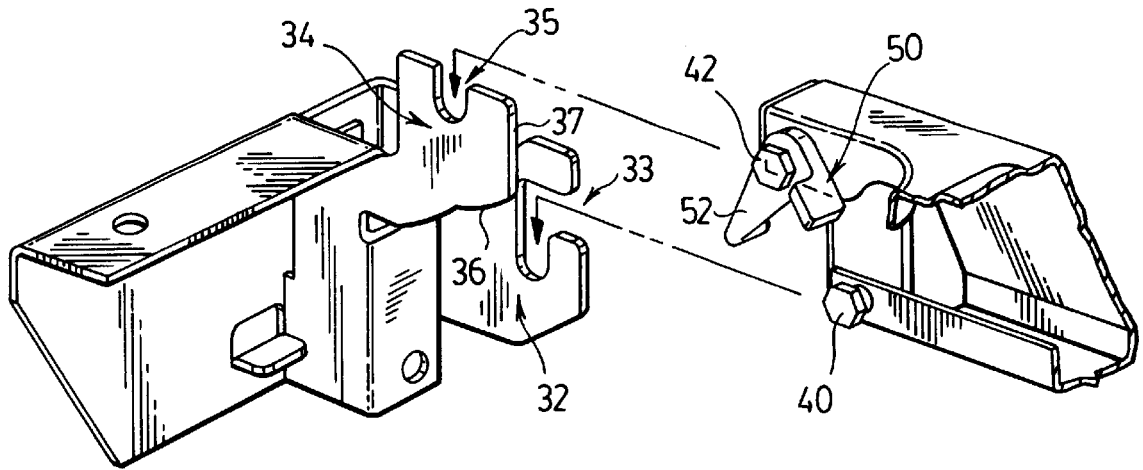
FIG. 3 is a partial perspective view of a portion of a shelf and the bracket showing a method of securing of the shelf on the bracket.
Figure 4:
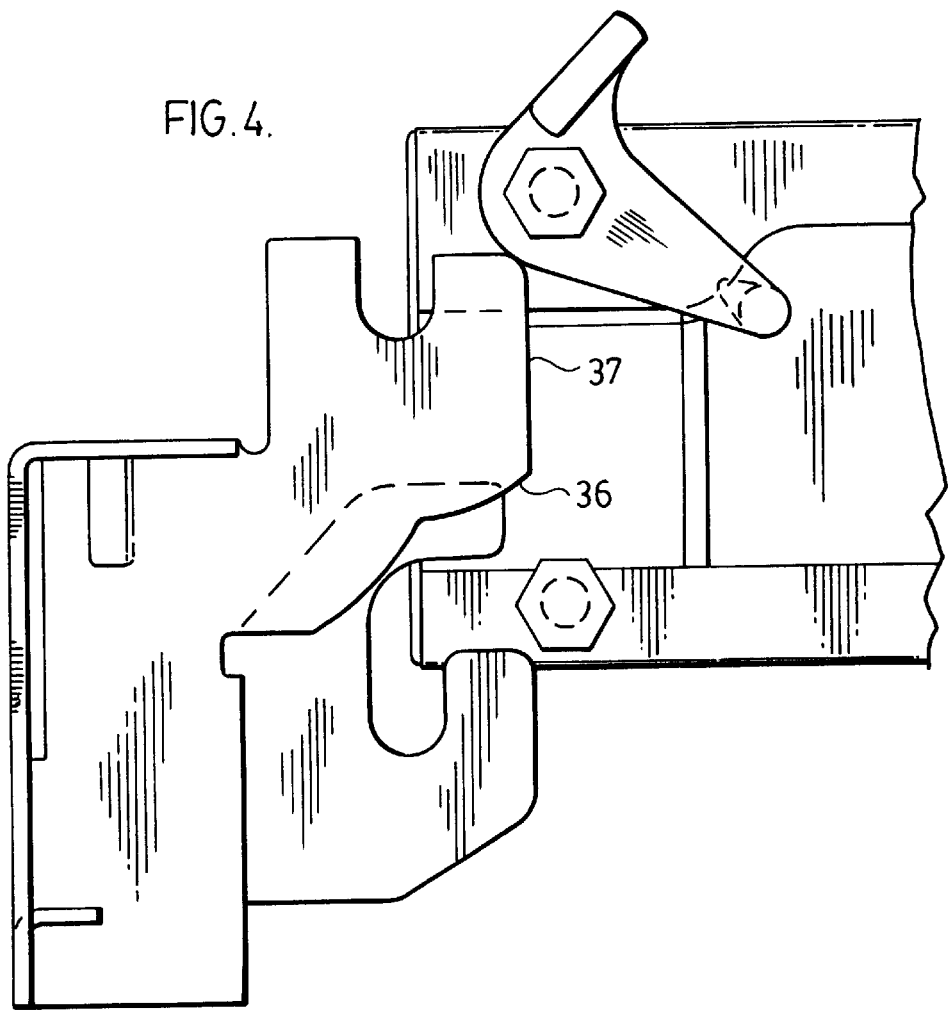
FIG. 4 is a side view of a bracket and a portion of the shelf being inserted on the bracket.
Figure 8:
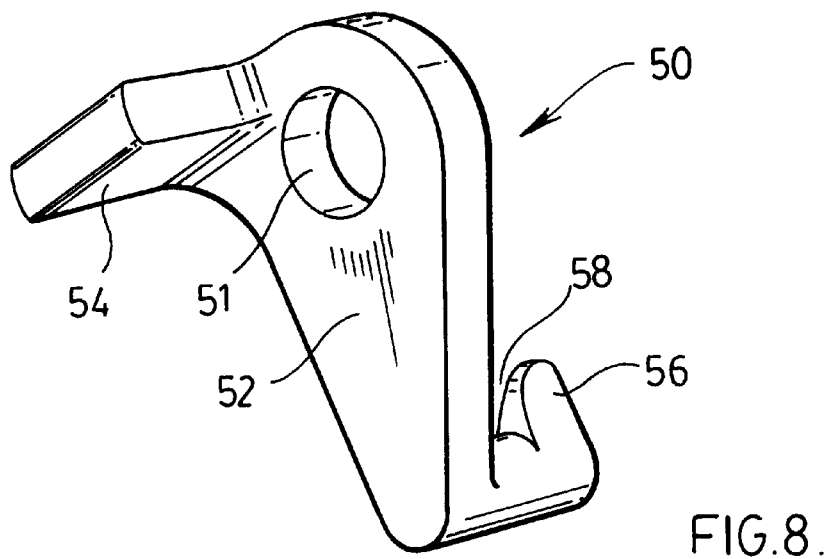
FIG. 8 is a perspective view of the latch.

As clearly shown by the arrows of FIG. 3, the securement of the shelf requires an inward movement as well as a downward movement. The shelf is basically removed in a similar manner. If one wishes to have the shelf hang, basically the shelf is lifted and then it pivots within slot 33 having pin 42 clear slot 35 to allow vertical hanging. All of these aspects are described in our earlier patent. It is sometimes possible during movement of a barbeque that the shelf 2 could be released from the bracket 7 in an unexpected manner. To overcome this possibility, pin 42 has been provided with a gravity latch 50 which has a catch arm 52 and a release arm 54. This gravity latch as shown in FIG. 8 is one piece and is freely pivotal on pin 42 but is captured adjacent the free end of the pin. The gravity latch 50 includes an inwardly extending locking flange 56 defining an upwardly opening channel 58 which in a locked position of the latch will receive edge 36 of arm 34 in the channel 58.

Figure 5:
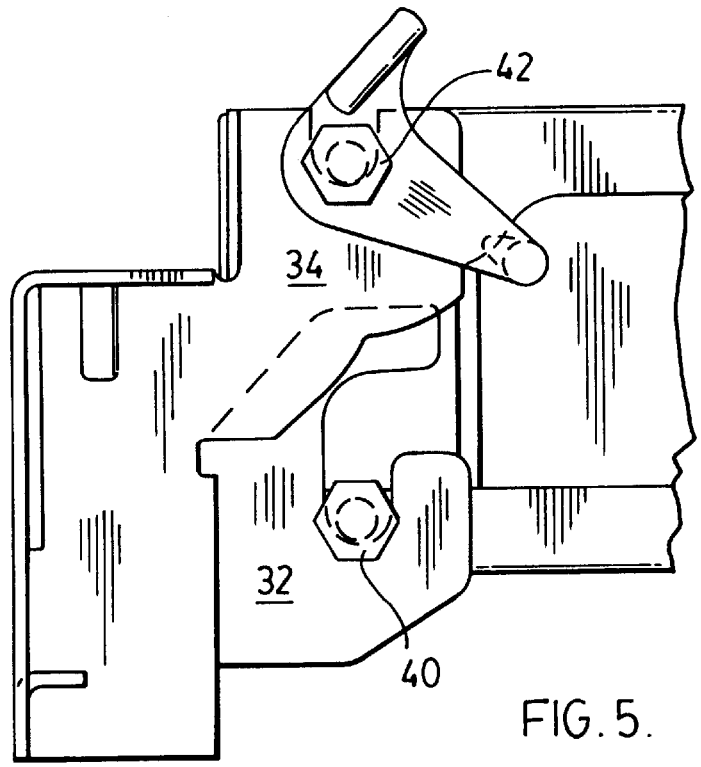
FIG. 5 is a side view of the bracket and shelf with the pins of the bracket located in the slots of the bracket with the safety latch in a release position.
Figure 6:
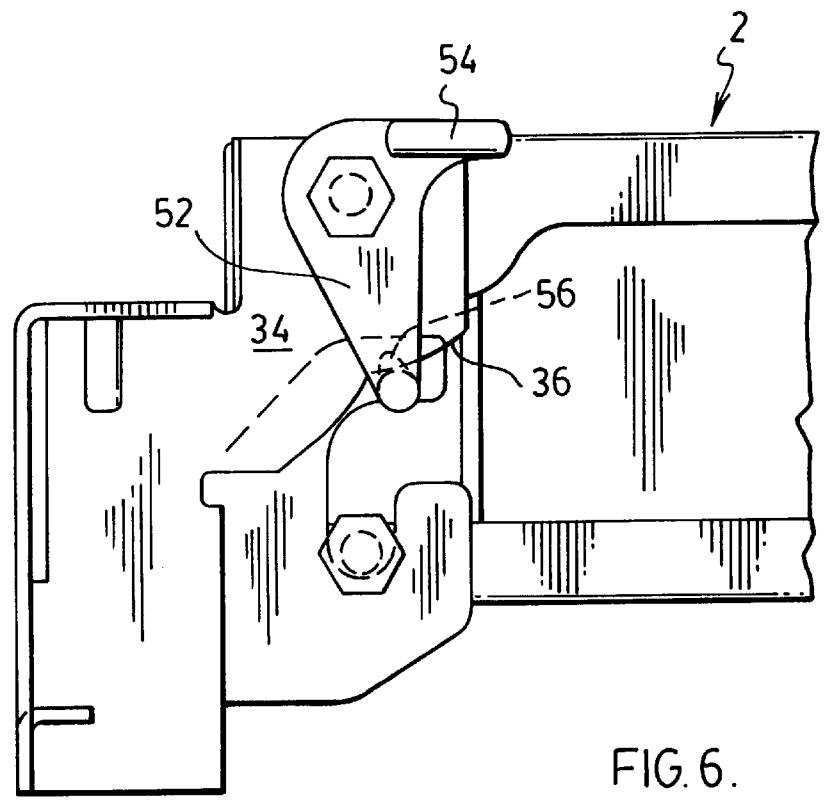
FIG. 6 is a view similar to FIG. 5 with the latch in the locked position.
Figure 7:
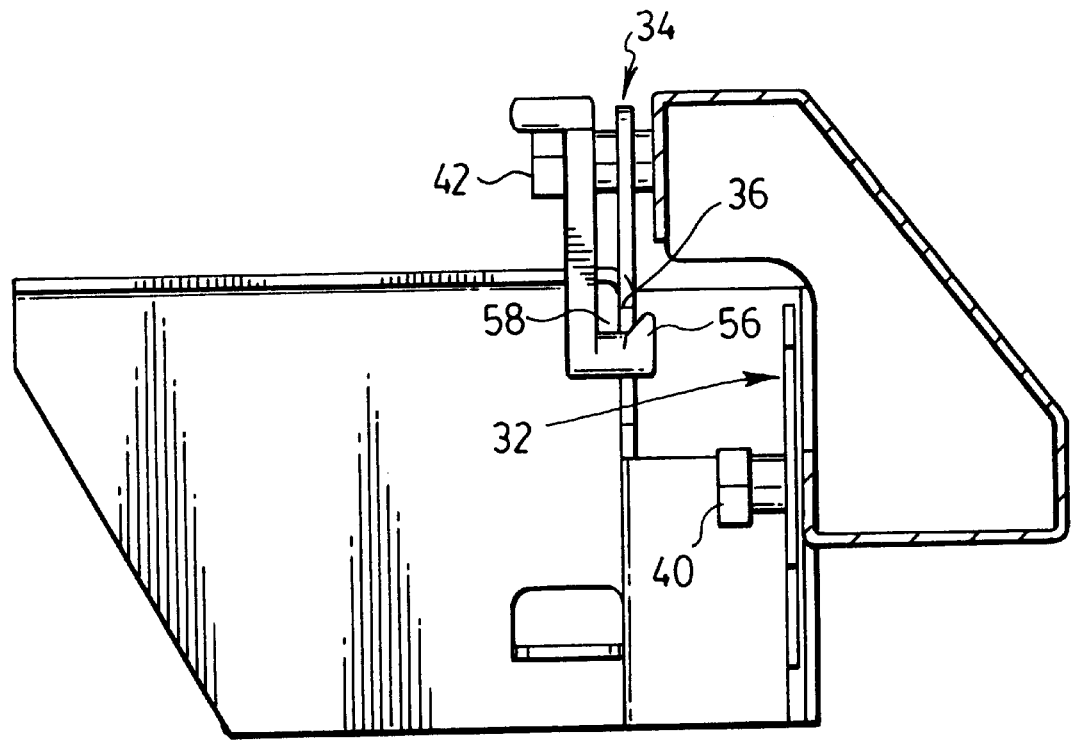
FIG. 7 is a front view of the shelf and bracket arrangement with the safety latch in the locked position.

The gravity latch as shown in FIG. 3 assumes a downwardly position and the user merely has to align the shelf with respect to the arms 32 and 34 and the latch 50 will automatically move to a clear type position in that it is forced to pivot in a counter clockwise position due to catch arm 52 striking face 37 of arm 34. Therefore to place a shelf on the barbeque and have it assume the horizontal position, the pins are inserted as shown in FIG. 3 and the latch 50 moves out of the way or a user could move the latch to the position of FIG. 4. In any event, the latch will either be moved by the user or be moved due to the action necessary for installing the shelf to a clear position as generally shown in FIG. 5. It can be seen from FIG. 5 that pins 40 and 42 are now been inserted in arms 32 and 34 and the gravity latch 50 is now free to move under the influence of gravity from the position of FIG. 5 to the locked position of FIG. 6. The catch arm 52 in FIG. 6 has positioned the locking flange 56 such that the channel 58 straddles part of arm 34 adjacent the curved lower edge 36 of arm 34. The gravity latch 50 now effectively locks pin 42 in the bottom of slot 35 such that pin 40 cannot gain access to the open throat of slot 33. The only way the shelf can be removed to allow movement thereof to a vertical hanging position is by the user moving the gravity latch to the position of FIG. 5. In this position, the shelf can then be moved upwardly allowing pins 42 and 40 to move within their slots and in particular, allowing pin 42 to clear its slot 35 whereafter the shelf can be completely removed or the shelf can then be pivoted about pin 40 with pin 40 then returning to its lower position with the shelf in a vertical hanging orientation from pin 40. Pin 42 is retained adjacent the free end of pin 42 in any conventional manner. For example, pin 42 can include a slight shoulder thereon with the gravity latch 50 including catches 51 allowing the latch to be forced onto the pin and retained in the desired position as generally shown in FIG. 7. With this arrangement, the latch is still freely moveable about pin 42 but is held in a desired vertical position for the cooperation with the arm 34.

The gravity latch of the present invention provides a simple means for positively maintaining the side shelves of a barbeque on the brackets of the cart. As clearly shown in FIG. 6, these latches are unobtrusive and are generally flushed with the top surface of the shelf 2 in the locked position. As clearly shown in FIG. 2, the shelf 2 does include a recessed portion 29 and the gravity latch and pins of the shelf are located either side of this notched area. It can also be appreciated from FIG. 2 how the gravity latches 50 are readily available and encourage a user to use his hands closely adjacent these latches to allow movement thereof and to either side of the shelf, making positioning of the shelf convenient.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A barbecue grill comprising
   a) a plurality of vertical leg members;
   b) a cooking vessel;
   c) a plurality of bracket arrangements where each bracket arrangement secures one of said vertical legs to said cooking vessel and each bracket arrangement includes a shelf support structure having a pair of horizontally and vertically offset slots;
   d) a barbecue shelf as supported either side thereof by one of said bracket arrangements, said barbecue shelf on each side thereof including a pair of horizontally and vertically offset pins adapted to slide within respective ones of said slots for selectively
      i) locking said shelf in a horizontal position,
      ii) pivotting of said shelf downwardly from said horizontal position to a vertical position,
      iii) removing said shelf from said bracket arrangements;
   said shelf including on each side thereof and associated with one of said pins a pivotal latch, said pivotal latch including a central bearing portion retained on and pivotal about said pin with said latch including a release arm and a catch arm, said catch arm including a locking flange for preventing removal of said shelf when in a horizontal position, said release arm being accessible at the top of said shelf and allowing movement of said latch between a locked position and a release position, said catch arm and said release arm cooperating to provide a gravity bias urging said latch to the locked position when said shelf is in said horizontal position, the release arm allows movement of the latch against said bias to the release position allowing said shelf to be removed or moved to said vertical position.

2. A barbecue grill as claimed in claim 1 wherein said latch is positioned inwardly of the sides of the shelf in a recessed area of said shelf.

3. A barbecue grill as claimed in claim 2 wherein said release arm in said locked position of the latch is generally flush with the plane of the horizontal shelf.

4. A barbecue grill as claimed in claim 1 wherein said release arm and said catch arm are generally perpendicular and said bearing is located adjacent the intersection of said arms.

5. A barbecue as claimed in claim 4 wherein said locking flange forms an upwardly opening channel which engages an undercut region of the respective arm.

* * * * *